(12) United States Patent
Kuraya

(10) Patent No.: US 9,787,857 B2
(45) Date of Patent: Oct. 10, 2017

(54) DISPLAY CONTROL APPARATUS AND COMPUTER PROGRAM

(71) Applicant: BROTHER KOGYO KABUSHIKI KAISHA, Nagoya-shi, Aichi-ken (JP)

(72) Inventor: Mayumi Kuraya, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 65 days.

(21) Appl. No.: 13/626,737

(22) Filed: Sep. 25, 2012

(65) Prior Publication Data

US 2013/0148177 A1 Jun. 13, 2013

(30) Foreign Application Priority Data

Dec. 9, 2011 (JP) .................................. 2011-270030

(51) Int. Cl.
*G06F 3/12* (2006.01)
*G06K 15/02* (2006.01)
(Continued)

(52) U.S. Cl.
CPC ..... *H04N 1/00013* (2013.01); *H04N 1/00023* (2013.01); *H04N 1/00037* (2013.01);
(Continued)

(58) Field of Classification Search
CPC ...... H04N 7/147; H04N 7/14; H04N 1/00013; H04N 1/00023; H04N 1/00068; H04N 1/00076
(Continued)

(56) References Cited

U.S. PATENT DOCUMENTS 5,396,587 A * 3/1995 Reed ..................... G06F 17/246
715/219
5,908,467 A * 6/1999 Barrett ............. G06F 17/30899
707/999.002
(Continued)

FOREIGN PATENT DOCUMENTS

GB 2407932 A 5/2005
JP 2002-163098 A 6/2002
(Continued)

OTHER PUBLICATIONS

European Patent Office, extended European Search Report for European Patent Application No. 12185689.2 (counterpart to above-captioned patent application), dated Sep. 18, 2013.
(Continued)

*Primary Examiner* — Akwasi M Sarpong
(74) *Attorney, Agent, or Firm* — Merchant & Gould P.C.

(57) ABSTRACT

A display control apparatus is configured to display on a display unit a user interface screen for an image data generating apparatus configured to generate image data using an image sensor. The display control apparatus includes a setting acquiring unit which is configured to acquire a setting value for generating the image data, a display determining unit which is configured to determine whether to display an update reception screen based on the acquired setting value, a display control unit which is configured to display the update reception screen on the display unit if the display determining unit determines to display the update reception screen, and is configured not to display the update reception screen on the display unit if the display determining unit determines not to display the update reception screen, and an instruction receiving unit which is configured to receive the update instruction through the update reception screen.

20 Claims, 8 Drawing Sheets

(51) Int. Cl.
*G06K 15/00* (2006.01)
*H04N 1/407* (2006.01)
*H04N 1/00* (2006.01)
*H04N 1/60* (2006.01)

(52) U.S. Cl.
CPC ..... *H04N 1/00068* (2013.01); *H04N 1/00076* (2013.01); *H04N 1/00437* (2013.01); *H04N 1/00482* (2013.01); *H04N 1/6036* (2013.01); H04N 1/00031 (2013.01); H04N 1/00045 (2013.01); H04N 1/00061 (2013.01); H04N 1/00087 (2013.01); H04N 1/00244 (2013.01); H04N 1/00832 (2013.01); H04N 2201/0084 (2013.01); H04N 2201/0094 (2013.01)

(58) Field of Classification Search
USPC ......... 358/1.13; 345/604, 204; 715/219, 848
See application file for complete search history.

(56) References Cited

U.S. PATENT DOCUMENTS

| | | | | |
|---|---|---|---|---|
| 6,522,347 | B1* | 2/2003 | Tsuji | G06Q 30/02 345/419 |
| 7,433,881 | B1* | 10/2008 | Hill | G06F 17/30265 |
| 8,400,647 | B2* | 3/2013 | Enami | G09G 5/391 345/173 |
| 9,064,279 | B1* | 6/2015 | Tuan | G06Q 30/0631 |
| 2002/0133544 | A1* | 9/2002 | Aoike | G08B 3/1083 709/203 |
| 2003/0048464 | A1* | 3/2003 | Yamada | H04N 1/6005 358/1.9 |
| 2003/0142330 | A1* | 7/2003 | Arakawa | G06K 15/00 358/1.9 |
| 2004/0021900 | A1* | 2/2004 | Arakawa | G06K 15/00 358/1.15 |
| 2005/0195212 | A1* | 9/2005 | Kurumisawa | G01J 3/462 345/604 |
| 2005/0259280 | A1* | 11/2005 | Rozzi | H04N 1/6052 358/1.9 |
| 2006/0015897 | A1* | 1/2006 | Kim | H04N 5/445 725/33 |
| 2006/0212906 | A1* | 9/2006 | Cantalini | H04N 5/44543 725/62 |
| 2007/0035614 | A1* | 2/2007 | Tamaru | H04N 7/147 348/14.08 |
| 2007/0124474 | A1* | 5/2007 | Margulis | G06F 3/14 709/226 |
| 2007/0279656 | A1* | 12/2007 | Yamauchi | H04N 1/6058 358/1.9 |
| 2008/0056458 | A1* | 3/2008 | Suito | G06Q 10/107 379/88.11 |
| 2009/0251715 | A1* | 10/2009 | Kita | G03G 15/01 358/1.9 |
| 2010/0033748 | A1* | 2/2010 | Enami | G09G 5/391 358/1.13 |
| 2013/0106810 | A1* | 5/2013 | Kim | G06F 1/3265 345/204 |
| 2013/0127928 | A1* | 5/2013 | Myers | G09G 5/02 345/690 |

FOREIGN PATENT DOCUMENTS

| | | | |
|---|---|---|---|
| JP | 2003-008917 | A | 1/2003 |
| JP | 2003008917 | A * | 1/2003 |
| JP | 2004-56574 | A | 2/2004 |
| JP | 2004-193707 | A | 7/2004 |
| JP | 2005-236772 | A | 9/2005 |
| JP | 2007-124242 | A | 5/2007 |
| JP | 2008-271154 | A | 11/2008 |
| JP | 2008-312117 | A | 12/2008 |

OTHER PUBLICATIONS

Office Action issued in related Japanese application No. 2011-270030, Sep. 8, 2015.
Foreign Communication issued in related European Application No. 12185689.2, dated Apr. 13, 2017.

* cited by examiner

| COLOR SETTING | COLOR | | | | | | | | MONO-CHROME |
|---|---|---|---|---|---|---|---|---|---|
| DOCUMENT PLACING METHOD | FLATBED (FB) | | | | AUTOMATIC CONVEYANCE (ADF) | | | | ALL METHOD |
| RESOLUTION (dpi) / FILE FORMAT | 100 | 200 | 300 | 600 | 100 | 200 | 300 | 600 | ALL RESOLUTION |
| JPEG | 0 | 2 | 3 | 5 | 0 | 1 | 2 | 4 | 0 |
| XPS | 0 | 1 | 2 | 4 | 0 | 0 | 1 | 2 | 0 |
| PDF | 0 | 1 | 2 | 4 | 0 | 0 | 1 | 2 | 0 |
| PDF/A | 0 | 2 | 3 | 5 | 0 | 1 | 2 | 4 | 0 |
| SECURITY PDF | 0 | 0 | 0 | 0 | 0 | 0 | 0 | 0 | 0 |
| PDF WITH SIGNATURE | 0 | 0 | 0 | 0 | 0 | 0 | 0 | 0 | 0 |
| SEARCHABLE PDF | 0 | 0 | 0 | 0 | 0 | 0 | 0 | 0 | 0 |
| HIGH COMPRESSION PDF | 0 | 0 | 1 | 3 | 0 | 0 | 0 | 1 | 0 |

0 TO 5: REQUIRED LEVEL OF UPDATE

REQUIRED LEVEL OF UPDATE   0  1  2  3  4  5
FREQUENCY OF UPDATE   LOW ←――――――――→ HIGH

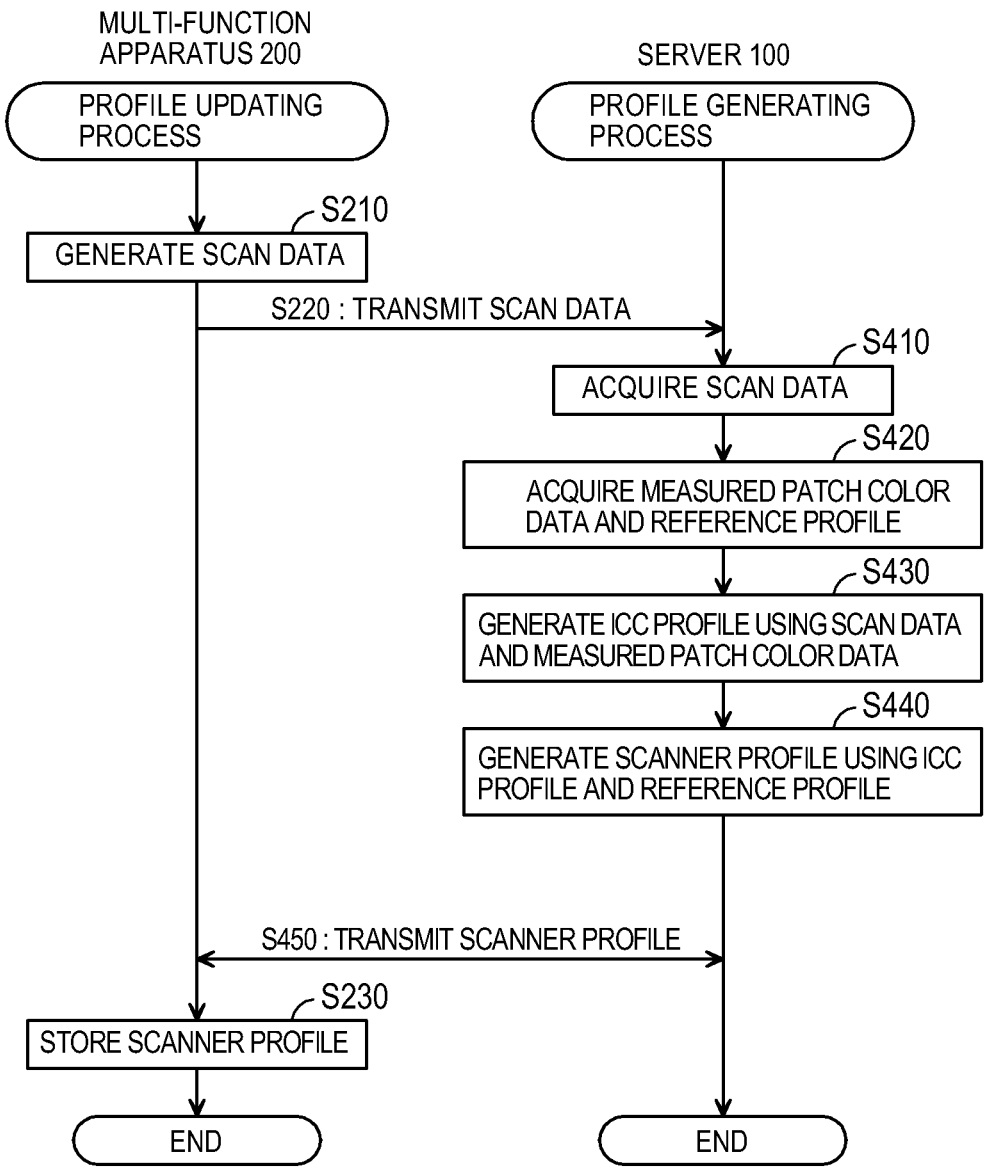

DISPLAY CONTROL APPARATUS AND COMPUTER PROGRAM

CROSS-REFERENCE TO RELATED APPLICATION

This application claims priority from Japanese Patent Application No. 2011-270030, filed on Dec. 9, 2011, the entire subject matter of which is incorporated herein by reference.

TECHNICAL FIELD

Aspects of the present invention relate to a technique of updating a color conversion profile for converting color data represented in a color system depending on an image data generating apparatus into color data represented in another color system.

BACKGROUND

A scanner generates image data configured with color data of a color system depending on the characteristics of the scanner (an apparatus-dependent color system). In general, color data (apparatus-dependent color data) of an apparatus-dependent color system of a scanner is converted into color data of an apparatus-independent color system independent from the characteristics of the scanner or color data of an apparatus-dependent color system of another apparatus. As a result, the image data generated by the scanner can be appropriately reproduced in another apparatus. This conversion uses a color conversion profile which defines the correspondence relationship between apparatus-dependent color data of a scanner and color data of a destination color system.

The characteristics of a scanner change with time and according to increases in the usage number of times. Therefore, in order to appropriately covert apparatus-dependent color data of a scanner into color data of a destination color system, it is advantageous to update a color conversion profile according to changes in the characteristics of the scanner. For example, JP 2003-8917A describes a technique which sets an expiration date for a color conversion profile, and if the color conversion profile is expired, notifies the user that the color conversion profile should be updated.

However, in this technique, convenience for the user of the scanner would be deteriorated. For example, even in a case where update of the color conversion profile is not necessary for the user, the notification is performed and the user may be unnecessarily burdened with the unnecessary update of the color conversion profile. This problem is common among image data generating apparatuses (such as scanners and digital cameras) which use image sensors (for example, one-dimensional image sensors of scanners, and two-dimensional image sensors of digital cameras) to generate image data.

SUMMARY

Accordingly, an aspect of the present invention provides a technique of appropriately updating a color conversion profile for an image data generating apparatus to improve conveyance of the image data generating apparatus.

According to an illustrative embodiment of the present invention, there is provided a display control apparatus which is configured to display on a display unit a user interface screen for an image data generating apparatus configured to generate image data using an image sensor. The display control apparatus includes a setting acquiring unit, a display determining unit, a display control unit, and an instruction receiving unit. The setting acquiring unit is configured to acquire a setting value for generating the image data. The display determining unit is configured to determine whether to display an update reception screen based on the acquired setting value. The update reception screen is for receiving an update instruction of a color conversion profile from a user, and the color conversion profile is for converting color data of a color system depending on the image data generating apparatus into color data of another color system. The display control unit is configured to display the update reception screen on the display unit if the display determining unit determines to display the update reception screen, and is configured not to display the update reception screen on the display unit if the display determining unit determines not to display the update reception screen. The instruction receiving unit which is configured to receive the update instruction through the update reception screen.

According to the above display control apparatus, a setting value for generating image data are used to determine whether to display an update reception screen for receiving an update instruction of a color conversion profile. As a result, if a setting which requires update of the color conversion profile is made, it is possible to receive an update instruction from the user. Therefore, the convenience of the image data generating apparatus can be improved.

Also, the present invention can be implemented in various forms such as a method for the image data generating apparatus, a computer program for implementing the functions of the image data generating apparatus or the corresponding method, and non-transitory computer-readable medium having the computer program stored thereon.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 7 is a flow chart showing operations of a profile updating process and a profile generating process;

DETAILED DESCRIPTION

A-1: Configuration of Color Conversion Profile Updating System 1000

Figure 1:
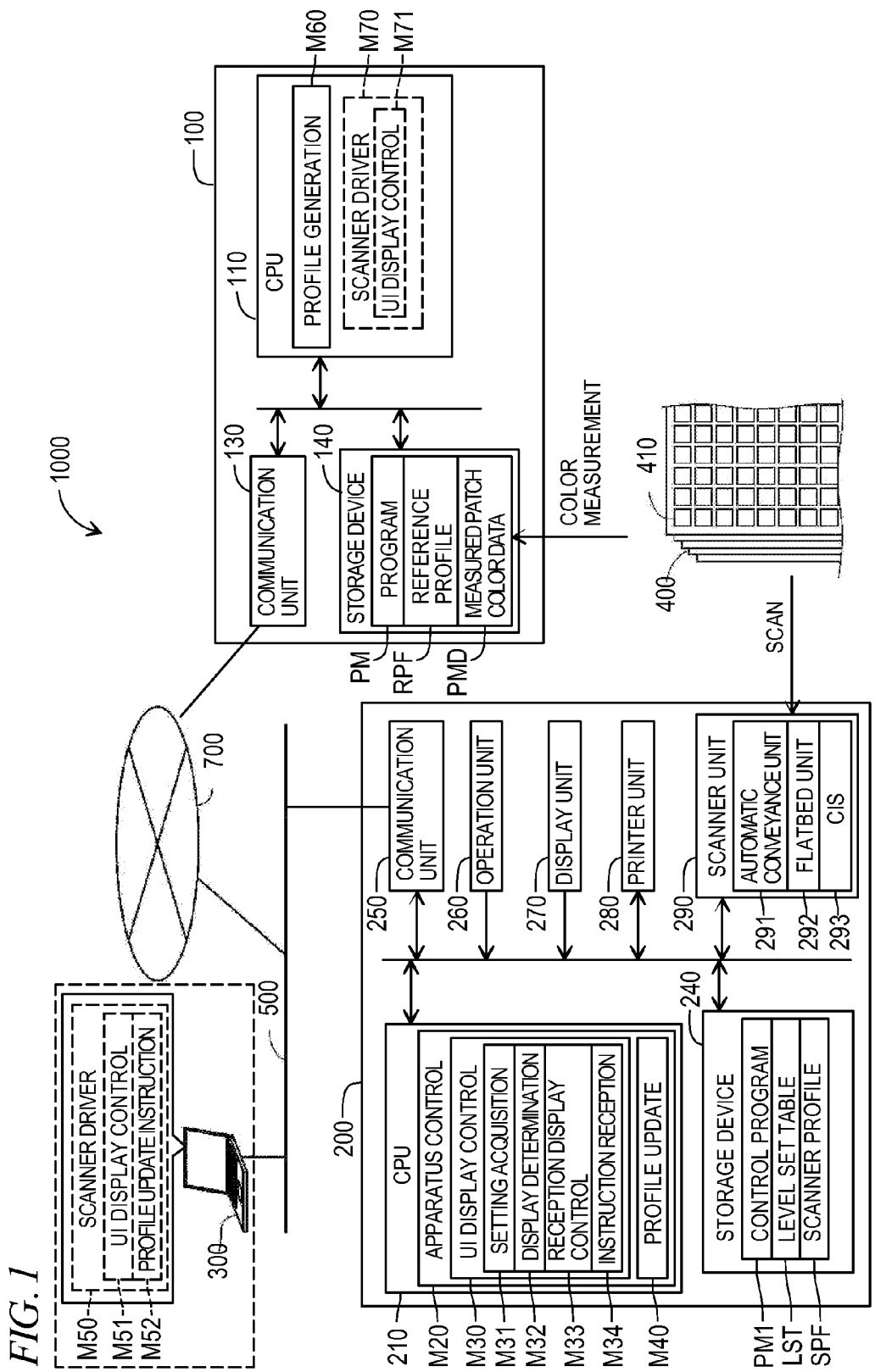
FIG. 1 is a block diagram showing the configuration of a color conversion profile updating system according to a first illustrative embodiment.

FIG. 1 is a block diagram showing the configuration of a color conversion profile updating system according to a first illustrative embodiment. A color conversion profile updating system 1000 includes a server 100 serving as a color conversion profile generating apparatus, and a multi-function apparatus 200 serving as a client. The multi-function apparatus 200 is communicably connected to an external apparatus through a LAN 500. The server 100 and the multi-function apparatus 200 are communicably connected with each other through the LAN 500 and the Internet 700.

The multi-function apparatus 200 includes a CPU 210 which controls entire operations of the multi-function apparatus 200, a storage device 240 such as internal storage devices (such as ROMs and RAMs) and external storage devices (such as hard disk drives), a communication unit 250 which communicates through a network, an operation unit 260 including various buttons, a display unit 270 such as a liquid crystal panel, an inkjet or laser type printer unit 280, and a scanner unit 290.

The scanner unit 290 includes an automatic conveyance unit 291, a flatbed unit 292, and a contact image sensor (CIS) 293. The automatic conveyance unit 291 is a mechanism for automatically conveying a plurality of document sheets placed by the user on one-by-one basis (also called an auto document feeder (ADF)). The flatbed unit 292 is a document placing unit including a platform (such as flatbed glass) for allowing the user to place documents thereon. The CIS 293 is an image reading mechanism including an image sensor, lenses, and a light source including red, green, and blue light emitting diodes (LEDs). The image sensor of the CIS 293 is a one-dimensional image sensor (line image sensor) having a configuration in which a plurality of photoelectric conversion elements such as CMOSs are arranged side by side in a line extending in a specific direction (also referred to as a line direction).

The CIS 293 of the present illustrative embodiment is configured to be movable by power of a stepping motor (not shown), and can read documents in two document placing method. In a first flatbed method, the CIS 293 reads a document placed on the flatbed unit 292 while moving in a scan direction (a direction perpendicular to the line direction of the CIS 293). In a second automatic conveyance method, the CIS 293 is fixed at a specific position, and reads a document conveyed by the automatic conveyance unit 291. Also, at each of the automatic conveyance unit 291 and the flatbed unit 292, a document detecting sensor (such as a sensor for optically detecting whether there is any document, not shown) is provided. If the document detecting sensor of the automatic conveyance unit 291 detects that a document is set on the automatic conveyance unit 291, the multi-function apparatus 200 uses the automatic conveyance method to read the document. Meanwhile, if the document detecting sensor of the flatbed unit 292 detects that a document is set on the flatbed unit 292, the multi-function apparatus 200 uses the flatbed method to read the document.

In the both method, the CIS 293 turns on the light source, and uses the image sensor to output the intensity of the reflected light from the document as an electric signal. The CPU 210 generates image data (scan data) including scanner RGB color data as pixel data based on the electric signal output from the CIS 293 of the scanner unit 290. Here, the scanner RGB color data are color data of a scanner RGB color system depending on the unique characteristics of the scanner unit 290 such as the characteristics of the LEDs of the light source and the photoelectric conversion elements.

The storage device 240 stores a control program PM1, a scanner profile SPF, and a level set table LST. The CPU 210 executes the control program PM1 stored in the storage device 240 to perform an apparatus control M20 of controlling entire operations of the multi-function apparatus 200.

The apparatus control M20 includes a UI display control M30 and a profile update M40. The UI display control M30 provides a user interface for allowing the user to use the multi-function apparatus 200 though the display unit 270. As will be described below in detail, the UI display control M30 displays a predetermined user interface screen on the display unit 270. The UI display control M30 includes a setting acquisition M31, a display determination M32, a reception display control M33, and an instruction reception M34. If an instruction for updating a scanner profile SPF is received from the user, the profile update M40 performs a process for updating the scanner profile SPF. These individual functions and operations will be described below.

Figures 2A, 2B:
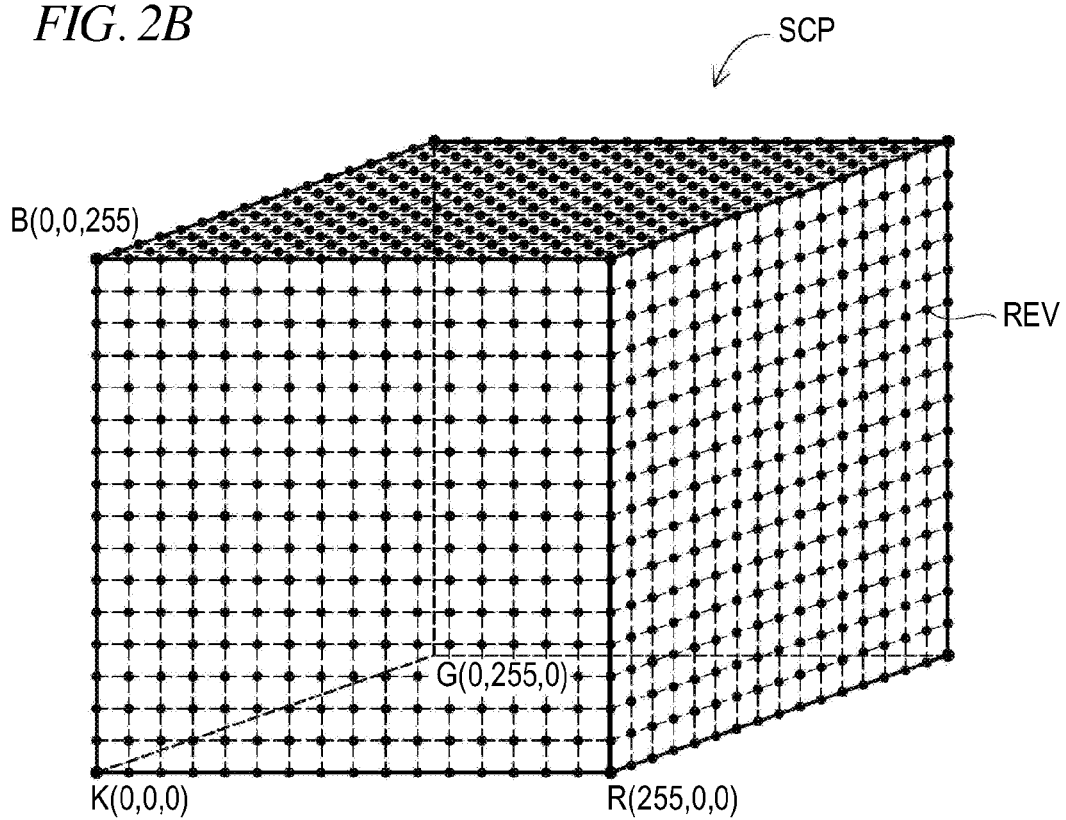
FIGS. 2A and 2B are views for explaining an example of a scanner profile SPF.

FIGS. 2A and 2B are views for explaining an example of the scanner profile SPF stored in the storage device 240. As shown in FIG. 2A, the scanner profile SPF is a table in which each of N number of (4913 in the present illustrative embodiment) scanner RGB color data having numbers of 1 to N is associated with one color data (sRGB color data) expressing a color represented by the corresponding scanner RGB color data, in an sRGB color system. The N-number of scanner RGB color data having the numbers of 1 to N are referred to as representative color data REV of the scanner RGB color data, or simply referred to as representative color data REV. In the present illustrative embodiment, the values (an R value, a G value, and a B value) of the color components of each scanner RGB color data and the values (an R value, a G value, and a B value) of the color components of each sRGB color data are represented in 256 grayscale levels. Here, the sRGB color data is a color data represented in a standard RGB (sRGB) color system which is a standard color system for monitors and the like. The scanner RGB color system and the sRGB color system are similar in that they have RGB component values, but are different from each other.

Each of the R, G, or B values of the N-number of representative color data REV in the scanner profile SPF has a specific value of n number of values set at almost regular intervals between 0 to 255. In the present illustrative embodiment, the predetermined number 'n' is 17. In this case, 'N' which is the number of representative color data REV is 4913 (17×17×17). FIG. 2B conceptually shows the positions of the representative color data REV in a scanner RGB color space SCP.

The apparatus control M20 converts scan data represented by scanner RGB color data into image data represented by sRGB color data with reference to the scanner profile SPF. As a result, the apparatus control M20 outputs the scan data represented by the sRGB color data of the standard color system to a personal computer of the user. Therefore, if the scanner profile SPF accurately defines the correspondence relationship between the scanner RGB color data and the sRGB color data, the user can appropriately reproduce the scan data, for example, with another apparatus.

Meanwhile, the characteristics of the light source and the image sensor of the CIS 293 change with an increase in the cumulative scan number of times and passage of time. Due to changes in the scanner characteristics, even if the same color is read, the output signal of the CIS 293 would change. Therefore, even if the same color is read, the values of scanner RGB color data generated before and after the changes of the scanner characteristics would become different. As a result, with an increase in the cumulative scan number of times and passage of time, a deviation occurs in the correspondence relationship between the scanner RGB color data and the sRGB color data. For this reason, in order to maintain the reproducibility (image quality) of the scan data represented by the sRGB color data, it is advantageous to update the scanner profile SPF according to an increase in the cumulative scan number of times and passage of time. However, a high level of image quality is not required for all scan data, and therefore, it is advantageous to update the scanner profile SPF as needed according to the level of image quality required for scan data.

The server 100 includes a CPU 110, a storage device 140 such as internal storage devices and external storage devices, and a communication unit 130 including an interface for communicating with a network such as the Internet 700. The storage device 140 stores a computer program PM, a reference profile RPF, and measured patch color data PMD. The computer program PM may be provided in a form of being recorded in computer-readable recording media such as a semiconductor memory (such as a ROMs, a RAM, and a flash memory) and a magnetic memory medium (such as a CD-ROM and a hard disk).

The reference profile RPF is a color conversion profile which defines the correspondence relationship between reference color data represented in a reference color system and sRGB color data represented in the sRGB color system. The reference color data are, for example, color data represented in an apparatus-independent color system (specifically, a CIELAB color system, a CIEXYZ color system, a CIELUV color system, or the like) independent from the apparatus.

The measured patch color data PMD is obtained by measuring a plurality of color patches 410 arranged in a color chart 400 with a spectrophotometer. The color chart 400 includes a plurality of (for example, 1000) color patches 410 arranged therein. The plurality of color patches 410 have a plurality of different colors selected such that the colors are uniformly distributed all over the color space of the reference color system, respectively. A copy substantially same as the color chart 400 is provided to the user of the multi-function apparatus 200, and is used when the scanner profile SPF is updated (to be described below). The measured patch color data PMD is data associating the plurality of color patches 410 and the reference color data representing the colors of the plurality of color patches 410.

The CPU 110 executes the computer program PM to perform a profile generation M60. The profile generation M60 includes various operations which will be described below. The CPU 110 may also perform a scanner driver M70 as shown by a broken line. This will be described below as a modified illustrative embodiment. The color conversion profile updating system 1000 may also include a computing device 300 which is communicably connected to the multi-function apparatus 200 and the server 100 as shown by a broken line. This will be described below as a modified illustrative embodiment.

A-2: Scanning Process of Multi-Function Apparatus 200

Figure 3:
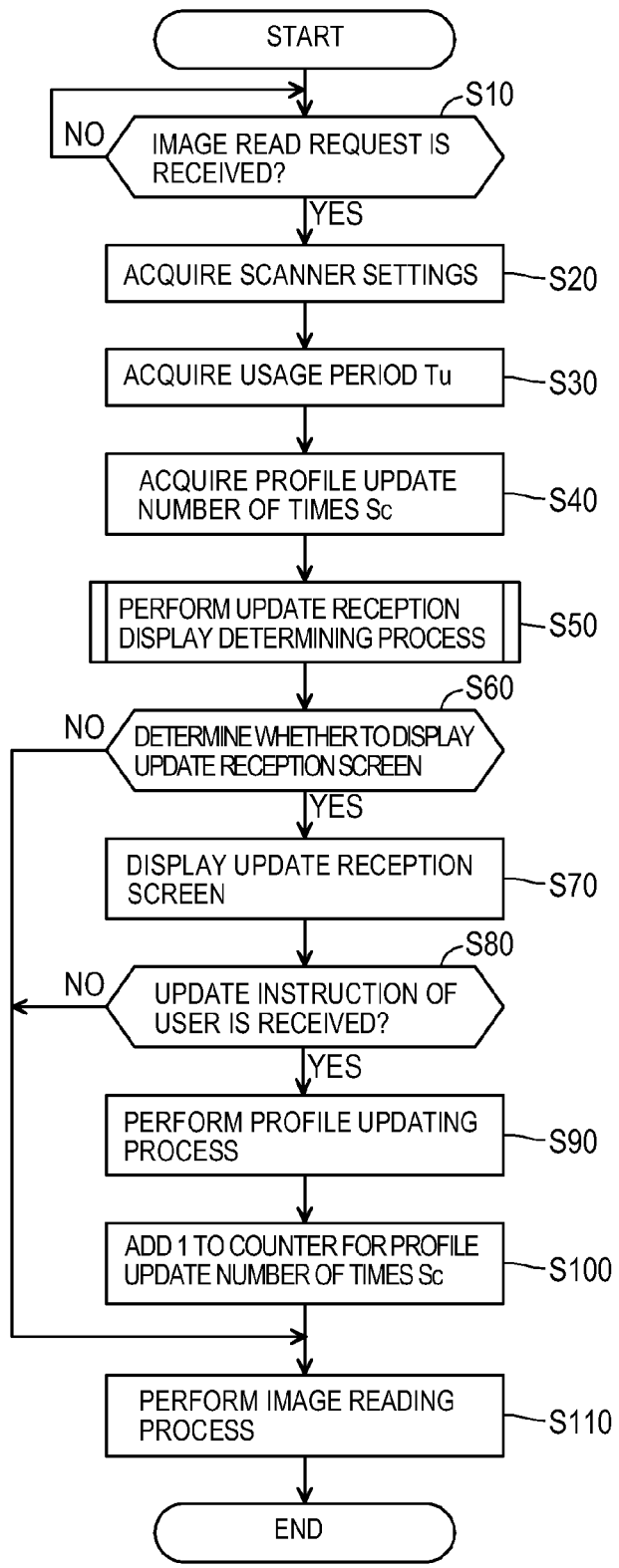
FIG. 3 is a flow chart showing operations of a scanning process.

The apparatus control M20 of the multi-function apparatus 200 performs a scanning process using the scanner unit 290 to read a document, and generating image data representing the document. FIG. 3 is a flow chart showing operations of the scanning process.

In Step S10, the UI display control M30 of the apparatus control M20 determines whether an image read request is received from the user through the operation unit 260. If an image read request is not received (NO in Step S10), the UI display control M30 stands by. If an image read request is received (YES in STEP S10), the process proceeds to Step S20.

In Step S20, the setting acquisition M31 of the UI display control M30 acquires scanner setting, that is, setting values for document scan based on the image read request received in Step S10. Setting items to be acquired may include, for example, the following setting items.

(A) Setting Items for Image Data (Scan Data) Representing Image of Scanned Document 1. Resolution of scan data: The multi-function apparatus 200 of the present illustrative embodiment can use four resolutions of 100 dots per inch (dpi), 200 dpi, 300 dpi, and 600 dpi.

2. Number of colors capable being included in scan data (color setting): The multi-function apparatus 200 of the present illustrative embodiment can use a color mode (each of the R, G, and B components has 256 grayscale levels, that is, the number of colors is about sixteen millions (=256×256×256)) and a monochrome mode (the number of colors is 2).

3. File format for storing scan data: The multi-function apparatus 200 of the present illustrative embodiment can set the following file formats: a joint photographic experts group (JPEG) format, an XML paper specification (XPS) format, a general portable document Format (PDF), a PDF/A, a security PDF, a PDF with signature, a searchable PDF, and a high compression PDF.

(B) Setting on document placing method: The multi-function apparatus 200 of the present illustrative embodiment can use two document placing method, that is, the automatic conveyance method and the flatbed method.

It is noted that the file formats used herein are different from compression methods. For example, scan data stored in the PDF are often data compressed in a JPEG method. In this case, the file format is the PDF, not the JPEG.

The PDF/A is a file format according to an international standard (ISO 19005) defined by the International Organization for Standardization (ISO). The PDF/A includes an ICC profile, and is appropriate for long term preservation. The security PDF is a PDF having a security setting such as restriction on access, copy, or print set using a password. The PDF with signature is a PDF with a digital signature as a proof of a creator or the like. The searchable PDF is a PDF including text data representing the contents of letters included in image data. The high compression PDF is a PDF including high compression image data compressed at a higher compression ratio than image data compressed in a general JPEG method. For example, high compression image data can be generated by performing image processing to separate image data into a text portion, a color photo image portion, and the like, and compressing each portion using a compression method appropriate for the corresponding portion. Also, the general PDF is a PDF which does not have the features of the above-mentioned specific PDFs (the PDF/A, the security PDF, the PDF with signature, the searchable PDF, and the high compression PDF). For example, the general PDF is a PDF including image data simply compressed in the JPEG method.

For example, the setting acquisition M31 acquires setting values having been input by the user, with respect to setting items whose setting contents have been input by the user, among the setting items of the above-mentioned item (A). Meanwhile, the setting acquisition M31 acquires the setting values of defaults (initial values), with respect to setting items whose setting values have not been input by the user, among the setting items of the above-mentioned item (A). Also, with respect to the setting item of the above-mentioned item (B), as described above, the setting acquisition M31 uses the document detecting sensors to acquire (recognize) which of the automatic conveyance method and the flatbed method will be used.

In Step S30, the UI display control M30 acquires a usage period Tu. The usage period Tu is a value which is counted by the CPU 210, and is, for example, the number of months representing the usage period of the scanner unit 290. The usage period Tu may be counted from when the multi-function apparatus 200 is initially turned on (power is first supplied), or may be counted from when the scanning process using the scanner unit 290 is first performed.

In Step S40, the UI display control M30 acquires a profile update number of times Sc. The profile update number of times Sc is a value which is counted by the CPU 210, and is a value representing the number of times the scanner profile SPF has been updated by a profile updating process to be described below.

Figure 4:
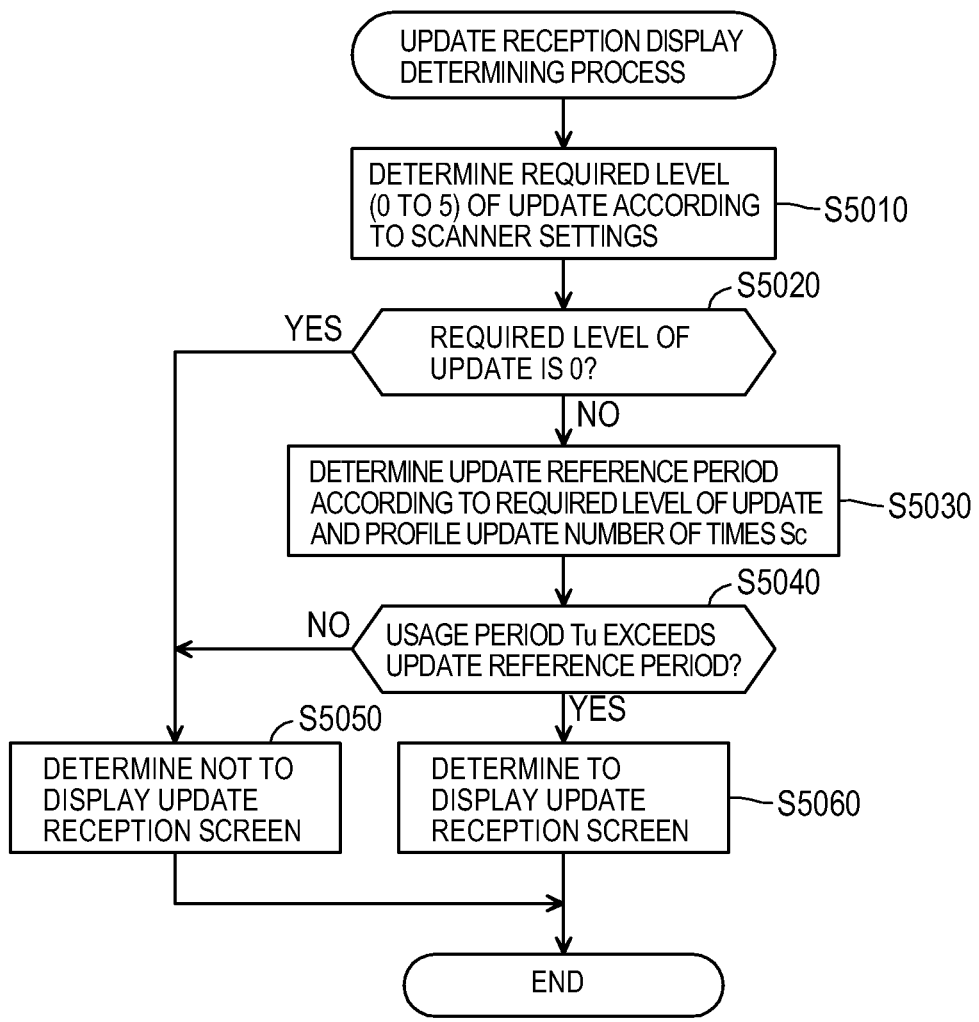
FIG. 4 is a flow chart showing operations of an update reception display determining process according to the first illustrative embodiment.

In Step S50, the display determination M32 of the UI display control M30 performs an update reception display determining process. FIG. 4 is a flow chart showing operations of the update reception display determining process.

In Step S5010, the display determination M32 determines the required level of update according to the scanner settings acquired in Step S10. The required level of update represents the level of the need to update the scanner profile SPF, and is represented by an integer ranging from 0 to 5 in the present illustrative embodiment. A higher required level of update indicates that the need to update the scanner profile SPF is higher.

Figure 5:
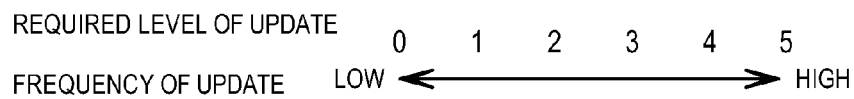
FIG. 5 is a view showing an example of contents of a level set table LST.

The determination of the required level of update is performed with reference to the level set table LST stored in the storage device 240. FIG. 5 is a view showing an example of the contents of the level set table LST. As shown in FIG. 5, in a case where the monochrome mode is set as the color setting of the scan data, the required level of update is determined to 0, regardless of the values of the other setting items. This is because, in the monochrome mode, it can be considered that the level of image quality which the user requires for scan data is very low, as compared to a case where the color mode is set as the color setting.

In a case where 100 dpi which is the lowest resolution of the settable resolutions is set as the setting for the resolution of scan data, the required level of update is determined to 0, regardless of the values of the other setting items. Also, as can be seen from cases where the file format is the JPEG format, the XPS format, the PDF, or the PDF/A, the required level of update tends to be set to a higher value as the set resolution is higher. This is because it can be considered that the level of image quality which the user requires for scan data is higher as the set resolution is higher.

In a case where any one of the security PDF, the PDF with signature, and the searchable PDF is set as the setting for the file format of scan data, the required level of update is determined to 0, regardless of the values of the other setting items. This is because scan data to be stored in the security PDF, the PDF with signature, and the searchable PDF are more likely to be data obtained by reading text documents, as compared to the other file formats (such as the JPEG format). The reason is that it can be considered that the levels of image quality which the user requires for scan data obtained by reading text documents is lower than the levels of image quality which the user requires for scan data obtained by reading photo documents and drawing documents.

In a case where the setting for the file format of scan data is the JPEG format or the PDF/A, the required level of update is set to be higher, as compared to a case where the setting for the file format is the XPS format or the general PDF and the contents of the other settings are the same as those in the case where the setting for the file format is the JPEG format or the PDF/A. This is because it can be considered that the JPEG format is more likely to be used for storing scan data obtained by photo documents and the level of image quality required for the JPEG format is likely to be higher, as compared to the XPS format or the PDF. Also, this is because it can be considered that since the PDF/A is more likely to be used for long term preservation and includes an ICC profile, the level of required image quality is higher, as compared to the XPS format or the PDF.

In a case where the setting for the file format of scan data is the high compression PDF, the required level of update is set to be lower, as compared to a case where the setting for the file format is the XPS format or the general PDF and the values of the other settings are the same as those in the case where the setting for the file format is the high compression PDF. This is because it can be considered that since the high compression PDF is likely to be used in a case where priority is given to the smallness of a data size over the level of image quality, the level of required image quality is low.

In a case where the document placing method setting is the flatbed method, the required level of update is set to be higher, as compared to a case where the document placing method setting is the automatic conveyance method and the values of the other settings are the same as those in the case where the document placing method setting is the flatbed method. This is because photo documents are likely to be read in the flatbed method and text documents are likely to be read in the automatic conveyance method.

In Step S5020 of FIG. 4, the display determination M32 determines whether the required level of update determined in Step S5010 is 0. In a case where the required level of update is 0 (YES in Step S5020), in Step S5050, the display determination M32 determines not to display an update reception screen. Meanwhile, in a case where the required level of update is not 0 (NO in Step S5020), in Step S5030, the display determination M32 determines an update reference period Tth according to the required level of update and the profile update number of times Sc. The update reference period Tth (in a unit of the number of months) can be calculated, for example, using the following equations.

$$\text{Case where required level of update is 1: } Tth = 9 \times (Sc+1) \quad (1)$$

$$\text{Case where required level of update is 2: } Tth = 6 \times (Sc+1) \quad (2)$$

$$\text{Case where required level of update is 3: } Tth = 4 \times (Sc+1) \quad (3)$$

$$\text{Case where required level of update is 4: } Tth = 2 \times (Sc+1) \quad (4)$$

$$\text{Case where required level of update is 5: } Tth = Sc+1 \quad (5)$$

As can be understood from these equations, the update reference period Tth is determined to a smaller value as the required level of update is higher, and is determined to a larger value as the profile update number of times Sc is larger.

In Step S5040, the display determination M32 determines whether the usage period Tu exceeds the update reference period Tth. In a case where the usage period Tu exceeds the update reference period Tth (YES in Step S5040), in Step S5060, the display determination M32 determines to display the update reception screen. Meanwhile, in a case where the usage period Tu does not exceed the update reference period Tth (NO in Step S5040), in Step S5050, the display determination M32 determines not to display the update reception screen. If the determination on whether to display the update reception screen in Step S5050 or Step S5060 is completed, the update reception display determining process terminates.

Returning to FIG. 3, in a case of determining in the update reception display determining process of Step S50 not to display the update reception screen (NO in Step S60), the process proceeds to Step S110. Meanwhile, in a case of determining to display the update reception screen (YES in Step S60), in Step S70, the reception display control M33 of the UI display control M30 displays the update reception screen on the display unit 270.

Figure 6A:
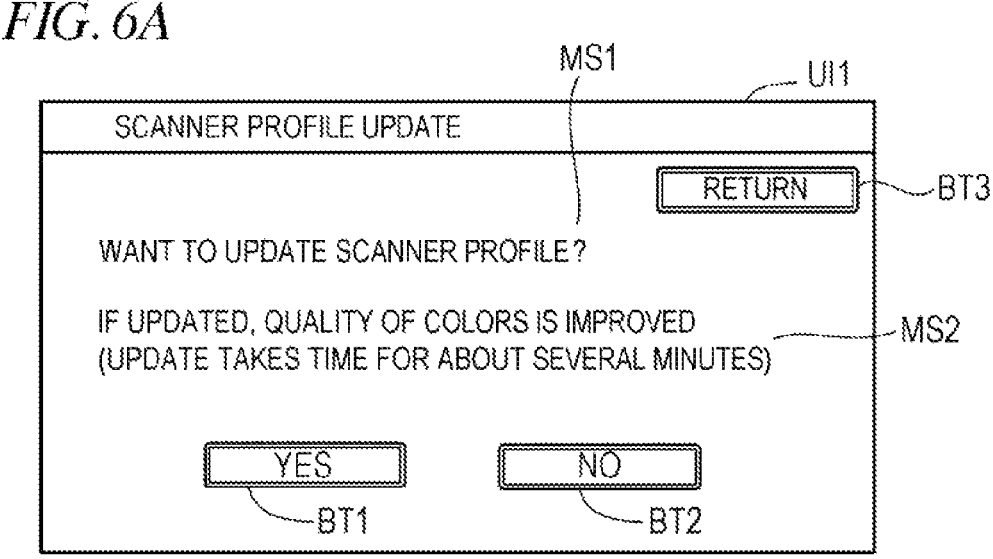
FIGS. 6A and 6B are views showing an example of an update reception screen and an example of an update operation instruction screen.
Figure 6B:
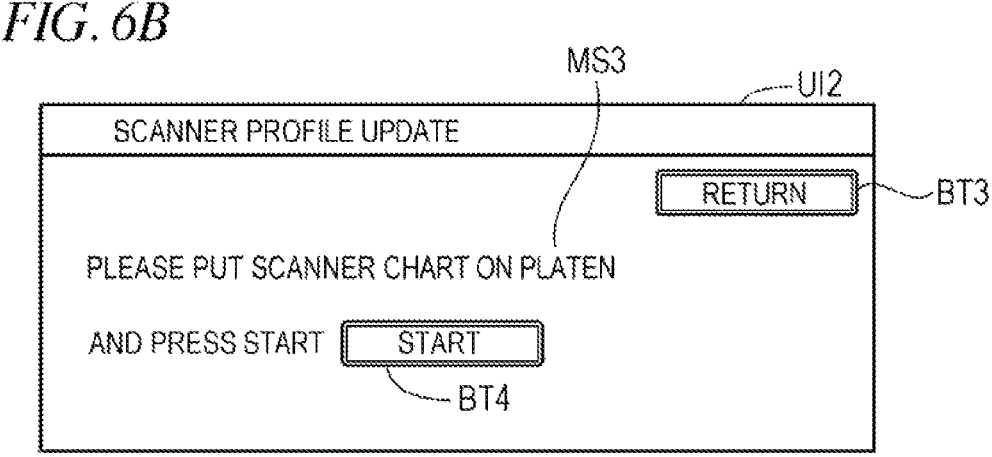

FIGS. 6A and 6B are views showing an example of the update reception screen and an example of an update operation instruction screen. An update reception screen UI1 (FIG. 6A) is a display screen for receiving an instruction for updating the scanner profile SPF from the user. The update reception screen UI1 includes a message MS1 for prompting the user to update the scanner profile SPF, and a message MS2 for explaining the merit and demerit of update of the scanner profile SPF. The merit is that it is possible to improve the reproducibility (image quality) of colors of scan data represented by sRGB color data, and the demerit is that the update takes time or the user may need to do additional work (such as preparation of the color chart 400) for the updating. The update reception screen UI1 includes buttons BT1 and BT2 displayed for receiving an update instruction for updating the scanner profile SPF and a non-update instruction for refusing update of the scanner profile SPF, from the user, and a button BT3 displayed for receiving an instruction for making the display unit 270 return to a display state before the display of the update reception screen UI1.

In Step S80, the instruction reception M34 of the UI display control M30 receives any one of the update instruction and the non-update instruction from the user through the update reception screen UI1, and determines what the received instruction is. In a case where the instruction from the user is the non-update instruction (NO in Step S80), the process proceeds to Step S110. Meanwhile, in a case where the instruction from the user is the update instruction (YES in Step S80), in Step S90, the profile update M40 performs a profile updating process.

FIG. 7 is a flow chart showing operations of the profile updating process and a profile generating process. The profile updating process is a process in which the multi-function apparatus 200 uses the server 100 to update the scanner profile SPF.

In Step S210, the profile update M40 uses the scanner unit 290 to generate scan data of the color chart 400. This scan data is image data represented by scanner RGB color data (image data of a raw data format before being converted into the JPEG format or the like). The profile update M40 displays an update operation instruction screen UI2 shown in FIG. 6B. The update operation instruction screen UI2 includes a message MS3 for prompting the user to set the color chart 400 as a document on the scanner unit 290, and a button BT4 displayed for receiving an instruction for reading the color chart 400.

In Step S220, the profile update M40 transmits the generated scan data to the server 100. If the profile generation M60 of the server 100 acquires the scan data in Step S410, the profile generating process starts.

In Step S420, the profile generation M60 acquires the measured patch color data PMD and the reference profile RPF (FIG. 1) stored in the storage device 140. In Step S430, the profile generation M60 uses the scan data and the measured patch color data PMD to generate an ICC profile.

From the scan data, it is possible to acquire the correspondence relationship between the scanner RGB color data and the color patches 410 of the color chart 400. Further, from the measured patch color data PMD, it is possible to acquire the correspondence relationship between the color patches 410 and the reference color data (for example, color data of an apparatus-independent color system such as CIELAB). Therefore, the profile generation M60 can generate an ICC profile defining the correspondence relationship between the scanner RGB color data and the reference color data.

In Step S440, the profile generation M60 uses the ICC profile and the reference profile RPF to generate a new scanner profile SPF. From the ICC profile, it is possible to acquire the correspondence relationship between the scanner RGB color data and the reference color data. Further, from the reference profile RPF, it is possible to acquire the correspondence relationship between the reference color data and sRGB color data. Therefore, the profile generation M60 can generate a scanner profile SPF defining the correspondence relationship between the scanner RGB color data and the sRGB color data. Here, the generated scanner profile SPF is consistent with the current scanner characteristics of the scanner unit 290 of the multi-function apparatus 200. With reference to this scanner profile SPF, the multi-function apparatus 200 can convert scanner RGB color data acquired using the current scanner unit 290 into appropriate sRGB color data.

In Step S450, the profile generation M60 transmits the generated scanner profile SPF to the multi-function apparatus 200. When receiving the scanner profile SPF from the server 100, the profile update M40 of the multi-function apparatus 200 stores the corresponding scanner profile SPF in the storage device 240, thereby updating the scanner profile SPF. Upon storing the scanner profile SPF in the storage device 240, the profile update M40 terminates the process.

Returning to FIG. 3, in Step S100 of FIG. 3, the profile update M40 adds 1 to a counter for counting the profile update number of times Sc.

In Step S110, the apparatus control M20 performs the image reading process on a document according to an image read request, and generates scan data. Here, the apparatus control M20 uses the scanner profile SPF stored in the storage device 240 (updated scanner profile SPF in a case where update of the scanner profile SPF has been performed) to convert the scanner RGB color data configuring the scan data into sRGB color data.

According to the first illustrative embodiment described above, the settings for generating scan data are used to determine whether to display the update reception screen UI1 (update reception display) for receiving an instruction for updating the scanner profile SPF. Therefore, in a case where settings which require update of the scanner profile SPF is made, it is possible to receive the update instruction of the user. Therefore, the convenience of the multi-function apparatus 200 can be improved. For example, if the update reception screen UI1 were displayed in a case where the level of image quality required by the user is low, the user may input the update instruction although the user does not actually need the update. In this case, although the update of the scanner profile SPF is unnecessary, the user is made do additional work to update the scanner profile SPF (preparation of the color chart 400) and/or the user is made wait until the process of updating the scanner profile SPF terminates. Meanwhile, if the scanner profile SPF were updated only in a case where the user voluntary instructs update of the scanner profile SPF without displaying the update reception screen UI1, even in a case where update of the scanner profile SPF is necessary, the user may not update the scanner profile SPF. However, according to the present illustrative embodiment, since the scanner settings are used to determine whether to display the update reception screen UI1, a possibility that the update reception screen UI1 is displayed in a case where update is unnecessary is reduced, and a possibility that the update reception screen UI1 is not displayed although update is necessary is reduced. Therefore, the convenience of the user can be improved.

In a case where the resolution of scan data to be generated is low, it can be considered that the level of image quality desired by the user is lower, as compared to a case where the resolution is high. Therefore, it can be considered that the need to update the color conversion profile is low. In the present illustrative embodiment, in a case where the set resolution is 100 dpi lower than the other settable resolutions, the display determination M32 determines not to perform the update reception display. As a result, a possibility can be reduced that update reception display is performed when the update of the scanner profile SPF is unnecessary and the convenience is deteriorated.

It can be considered that the level of image quality desired by the user depends on the file format of scan data to be generated. Therefore, the need to update the scanner profile SPF depends on the file format of image data to be generated. In the present illustrative embodiment, in a case where the set file format is a specific file format (specifically, the security PDF, the PDF with signature, or the Searchable PDF), the display determination M32 determines not to perform update reception display. As a result, a possibility can be reduced that the update reception display is performed when the update of the scanner profile SPF is unnecessary and the convenience is deteriorated.

In a case where the number of colors of scan data to be generated is small, it can be considered that the level of image quality desired by the user is lower, as compared to a case where the number of colors is large. Therefore, it can be considered that the need to update the scanner profile SPF is low. In the present illustrative embodiment, in a case where the set number of colors is a specific number of colors (specifically, the monochrome mode (two colors)), the display determination M32 determines not to perform the update reception display. As a result, a possibility can be reduced that update reception display is performed when the update of the scanner profile SPF is unnecessary and the convenience is deteriorated.

In a case where the compression ratio of scan data to be generated is large, it can be considered that the level of image quality desired by the user is lower, as compared to cases where the compression ratio is small or compression is not performed. Therefore, it can be considered that the need to update the scanner profile SPF is low. In the present illustrative embodiment, in a case where the set compression ratio is large (in the case of the high compression PDF), the display determination M32 determines not to perform the update reception display. As a result, a possibility can be reduced that update reception display is performed when the update of the scanner profile SPF is unnecessary and the convenience is deteriorated.

Also, the display determination M32 uses the usage period Tu of the scanner unit 290 to determine whether to perform the update reception display. Specifically, in a case where the usage period Tu has reached the update reference period Tth determined according to the settings, the display determination M32 determines to perform the update reception display. Meanwhile, in a case where the usage period Tu has not reached the update reference period Tth, the display determination M32 determines not to perform the update reception display. As a result, it is possible to perform the update reception display at an appropriate timing according to the settings and the usage amount of the scanner.

Specifically, in a case where the usage period Tu has reached the update reference period Tth depending on the image settings (the resolution, the file format, the number of colors, and the compression ratio) which are information for determining whether the level of image quality desired by the user is high or low, the display determination M32 determines to perform the update reception display. Therefore, it is possible to appropriately determine whether to perform the update reception display according to the level of image quality desired by the user.

Also, the update reference period Tth after the update of the scanner profile SPF is determined to a larger value, as compared to the update reference period Tth before the update. In other words, the update reference period Tth is determined to a longer period (a reference for performing the update reception display becomes higher) as the profile update number of times Sc is larger. Therefore, it is possible to appropriately determine whether to perform the update reception display according to whether to update of the scanner profile SPF.

Also, in a case where a relatively low resolution is set, the update reference period Tth is determined to a longer period, as compared to a case where a relatively high resolution is set. Therefore, a possibility can be reduced that update reception display is performed although the level of required image quality is low such that update of the scanner profile SPF is unnecessary, and the convenience is deteriorated.

Also, in a case where the automatic conveyance unit 291 is used to generate scan data, the update reference period Tth is determined to a longer period, as compared to a case of generating scan data (in the flatbed method) without using the automatic conveyance unit. In a case of using the automatic conveyance unit 291 for automatically conveying a plurality of document sheets, it can be considered that it is likely to make the scanner read text documents, and the level of image quality required for image data to be generated is lower as compared to a case where the automatic conveyance unit 291 is not used. In the present illustrative embodiment, it is possible to receive the update instruction of the user at an appropriate timing according to whether to use of the automatic conveyance unit 291.

B. Second Illustrative Embodiment

In the scanning process of the first illustrative embodiment, the usage period Tu is used to determine whether to display the update reception screen. However, the present invention is not limited to the usage period Tu. Another value representing the usage amount of the scanner unit 290 may be also used. For example, in a scanning process of a second illustrative embodiment to be described below, instead of the usage period Tu used in the scanning process of the first illustrative embodiment, the usage number of times Cu is used as the value of usage amount. The usage number of times Cu is counted by the CPU 210, and is a value representing the cumulative number of times the scanning process is performed. Specifically, in Step S30 (FIG. 3) of the scanning process, the UI display control M30 acquires the usage number of times Cu, instead of the usage period Tu.

Figure 8:
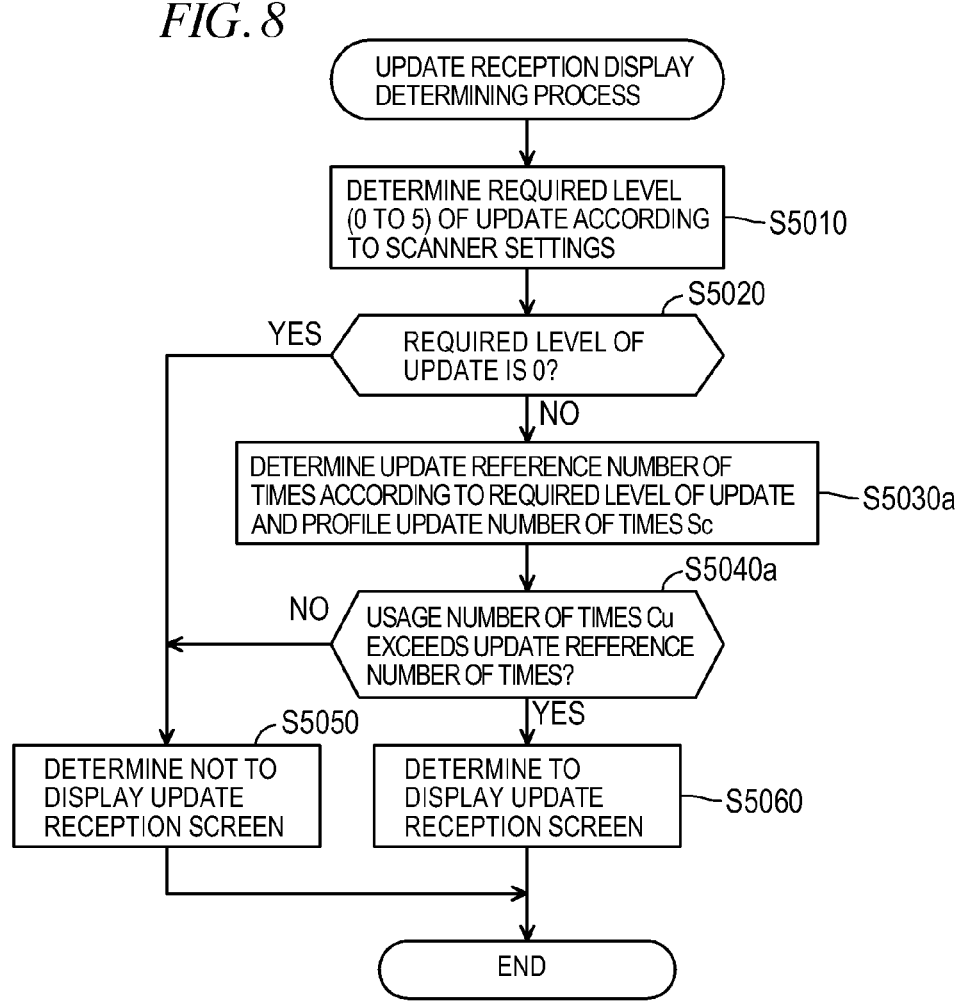
FIG. 8 is a flow chart showing operations of an update reception display determining process according to a second illustrative embodiment.

Then, in the scanning process of FIG. 3, in the update reception display determining process of Step S50, the UI display control M30 uses the usage number of times Cu, instead of the usage period Tu. FIG. 8 is a flow chart showing operations of an update reception display determining process of the second illustrative embodiment.

In the update reception display determining process of the second illustrative embodiment, the UI display control M30 performs Step S5030a and Step S5040a shown in FIG. 8, instead of Step S5030 and Step S5040 (FIG. 4) in the update reception display determining process of the first illustrative embodiment.

In Step S5030a, the display determination M32 determines a update reference number of times according to the required level of update and the profile update number of times Sc. The update reference number of times Cth can be calculated, for example, using the following equations.

Case where required level of update is 1:
$$Cth=2000\times(Sc+1) \quad (1)$$

Case where required level of update is 2:
$$Cth=1000\times(Sc+1) \quad (2)$$

Case where required level of update is 3: $Cth=500\times(Sc+1)$ (3)

Case where required level of update is 4: $Cth=100\times(Sc+1)$ (4)

Case where required level of update is 5: $Cth=50\times(Sc+1)$ (5)

As can be understood from these equations, the update reference number of times Cth is determined to a smaller value as the required level of update is higher, and is determined to a larger value as the profile update number of times Sc is larger.

In Step S5040a, the display determination M32 determines whether the usage number of times Cu exceeds the update reference number of times Cth. In a case where the usage number of times Cu exceeds the update reference number of times Cth (YES in Step S5040a), in Step S5060, the display determination M32 determines to display the update reception screen. Meanwhile, in a case where the usage number of times Cu does not exceed the update reference number of times Cth (NO in Step S5040a), in Step S5050, the display determination M32 determines not to display the update reception screen. The other steps of the update reception display determining process of the second illustrative embodiment are the same as corresponding steps of the update reception display determining process of the first illustrative embodiment, and thus are denoted in FIG. 8 by the same reference symbols as those of FIG. 4 and will not be described.

According to the second illustrative embodiment described above, the same effects as those of the first illustrative embodiment can be achieved. Also, in a case where a correlation between the magnitude of a change of the characteristics of the light source and the image sensor of the CIS 293 and the usage number of times Cu is larger than a correlation between the magnitude of a change of the characteristics of the light source and the image sensor and the usage period Tu, it is possible to more appropriately determine whether to display the update reception screen UI1, as compared to the first illustrative embodiment.

C. Modified Illustrative Embodiment (1) The profile updating process described in the first illustrative embodiment is just an example, and the present invention is not limited thereto. For example, a profile updating process may be completed only by the multi-function apparatus 200 without using the server 100. For example, the multi-function apparatus 200 may have the functions of the profile generation M60 of the server 100.

Figure 9:
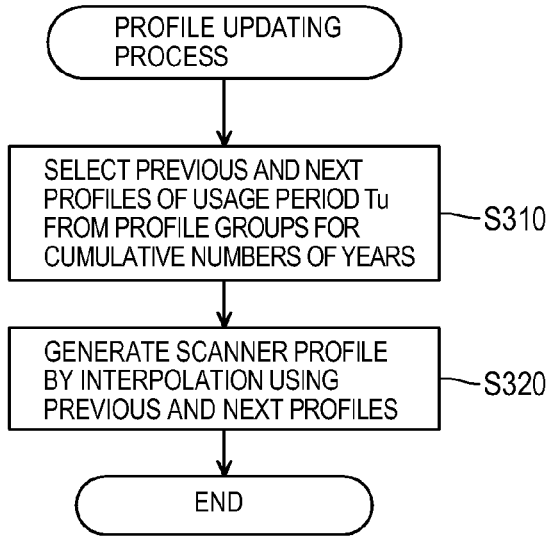
FIG. 9 is a flow chart showing a profile updating process according to a modified illustrative embodiment.

Also, another profile updating process to be described with reference to FIG. 9 may be used. FIG. 9 is a flow chart showing a profile updating process of a modified illustrative embodiment. In the present modified illustrative embodiment, a profile group for each cumulative number of years including a plurality of scanner profiles SPF according to aging of the scanner unit 290 of the multi-function apparatus 200 is prepared and is stored in the storage device 240 in advance. In this present modified illustrative embodiment, a plurality of scanner profiles SPF appropriate in cases where the number of years of use is 0 (initial state), 1, 3, or 5 is prepared, for example.

In Step S310 of FIG. 9, the profile update M40 selects a previous profile and a next profile according to the usage period Tu from the plurality of scanner profiles SPF included in the profile groups for cumulative numbers of years. The previous profile is a scanner profile SPF having an appropriate number of years closest to the current usage period Tu, out of scanner profiles SPF each of which has an appropriate number of years smaller than the current usage period Tu. The next profile is a scanner profile SPF having an appropriate number of years closest to the current usage period Tu, out of scanner profiles SPF each of which has an appropriate number of years larger than the current usage period Tu. If the usage period Tu is 20 months, the previous profile is a scanner profile SPF (a first-year profile) appropriate in a case where the number of years of use is 1, and the next profile is a scanner profile SPF (a third-year profile) appropriate in a case where the number of years of use is 3.

In Step S320, the profile update M40 generates a new scanner profile SPF by interpolation using the previous profile and the next profile. For example, a case where the usage period Tu is 20 months, the previous profile is the first-year profile, and the next profile is the third-year profile will be considered. In this case, a weight Wa is given to data of the first-year profile, a weight Wb is given to data of the third-year profile, and the average data of the weighted data is set as a new scanner profile SPF. Here, Wa is (36−20)/24, and Wb is (20−12)/24.

According to the above-mentioned modified illustrative embodiment, it is possible to update the scanner profile SPF with a simple configuration without using the server 100. Also, since the user does not need to prepare the color chart 400 and make the scanner unit 290 read the color chart 400, it is possible to reduce a load on the user for updating the scanner profile SPF. However, in a case of using an update method using the color chart 400 as in the first illustrative embodiment, it is possible to generate a scanner profile SPF capable of generating scan data having more superior reproducibility according to the current characteristics of the scanner unit 290.

(2) The scanner settings exemplified in the first illustrative embodiment are just examples, and the present invention is not limited thereto. For example, in a case where a plurality of compression ratios can be set for generating scan data using JPEG compression, the required level of update may be determined according to the compression ratio. Specifically, it is advantageous to determine the required level of update to be higher as the compression ratio is lower. The number of colors capable of being included in the scan data (color setting) is not limited to two kinds, that is, the color mode and the monochrome mode, but a grayscale mode (achromatic color mode), a 256-color mode, and the like may be used. In this case, it is advantageous to determine the required level of update to be higher as the number of colors capable of being included in scan data is larger.

(3) In the above illustrative embodiments, update of the scanner profile for converting scanner RGB color data into sRGB color data is performed. However, update of a color conversion profile for converting scanner RGB color data into color data of all other color systems may be performed. For example, the present invention may be applied for update of a copy profile for converting scanner RGB color data into color data of a CMYK color system corresponding to ink colors of a printer.

Also, the present invention is not limited to scanners, but can be applied for update of a color conversion profile for converting color data of an apparatus-dependent color system of another image data generating apparatus such as a digital camera into color data of a further color system (for example, color data of an apparatus-independent color system such as the CIELAB color system). In this case, it is possible to appropriately determine whether to perform update reception display of the color conversion profile for coping with aging of an optical system including an area image sensor (a two-dimensional image sensor) used in the digital camera, on a UI display unit of the digital camera, according to the settings of the digital camera. Settings of the digital camera which can be considered include, for example, the resolution of captured image data, a file format for storing the captured image data (a JPEG format, a RAW data format, or the like), and a compression ratio of the captured image data. The area image sensor is an image sensor including photoelectric conversion elements arranged in a two-dimensional area.

Generally, the present invention can be applied when a display control apparatus which displays a user interface screen for an image data generating apparatus for generating image data using an image sensor on a display unit updates a color conversion profile for converting color data of a color system depending on the image data generating apparatus into color data of another color system.

(4) The display determination M32 may determine whether to perform the update reception display using only the scanner settings, without using the value of usage amount such as the usage period Tu, the usage number of times Cu, or the like.

(5) The color conversion profile updating system 1000 may include the computing device 300 communicably connected to the multi-function apparatus 200 and the server 100 as shown by the broken line in FIG. 1. The computing device 300 may be a known personal computer. A CPU of the computing device 300 executes a driver program, thereby functioning as a scanner driver M50. The scanner driver M50 includes a UI display control M51 and a profile update instruction M52. The UI display control M51 performs the same processes as those of the UI display control M30 of the multi-function apparatus 200. However, the UI display control M51 performs the above-mentioned update reception display on a monitor of the computing device, not on the display unit 270 of the multi-function apparatus 200. In a case of receiving an instruction for updating the scanner profile SPF of the multi-function apparatus 200 through the update reception display, the profile update instruction M52 transmits the update instruction (update command) of the scanner profile SPF to the multi-function apparatus 200. However, in a case of a configuration in which the scanner profile SPF is stored in the storage device (such as a hard disk) of the computing device 300 and the computing device 300 converts scanner RGB color data configuring scan data acquired from the multi-function apparatus 200 into sRGB color data, the computing device 300 may perform the above-mentioned profile updating process (FIGS. 7 and 9).

Also, the CPU 110 of the server 100 may function as the scanner driver M70 as shown by a broken line in FIG. 1. In this case, for example, according to access from the computing device 300, the scanner driver M70 of the server 100 provides the driver function through a WEB browser of the computing device 300. The scanner driver M70 includes a UI display control M71 which performs the same processes as those of the UI display control M30 of the multi-function apparatus 200. However, the UI display control M71 performs the above-mentioned update reception display on the monitor (for example, a screen of the WEB browser) of the computing device 300, not on the display unit 270 of the multi-function apparatus 200.

As can be understood from the above description, the multi-function apparatus 200 (the UI display control M30) of the first illustrative embodiment is an example of a display control apparatus, and the server 100 (the UI display control M71) and the computing device 300 (the UI display control M51) of the present modified illustrative embodiment are examples of the display control apparatus.

(6) the server 100 is not limited to an apparatus housed in one casing, but may be configured by an apparatus including a plurality of computing devices housed in separate casings (for example, a distributed computing system which implements so-called cloud computing).

(7) In the above-mentioned illustrative embodiments, a portion of a configuration implemented by hardware may be replaced with software; whereas a portion of a configuration implemented by software may be replaced with hardware.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A display control apparatus which is configured to display on a display unit a user interface screen for an image data generating apparatus configured to generate image data using an image sensor, the display control apparatus comprising:

a processor; and a memory having a computer readable instructions stored theron that, when executed by the processor, causes the processor to function as:

a setting acquiring unit which is configured to acquire an image quality setting value, based on which the image data generating apparatus generates the image data using the image sensor such that the image data has the image quality indicated by the image quality setting value;

an update reference usage amount determining unit which is configured to determine an update reference usage amount based on the image quality setting value;

a usage amount value acquiring unit which is configured to acquire a usage amount value representing a current usage period or a current usage number of times of the image data generating apparatus, a display determining unit which is configured to determine whether to display an update reception screen if the acquired usage amount exceeds the update reference usage amount and determine not to display the update reception screen if the acquired usage amount does not exceed the update reference usage amount, wherein the update reception screen is for receiving an update instruction of a color conversion profile, including R values, G values and B values, based on which the image data in a color system depending on the image data generating apparatus is converted into image data of another color system;

a display control unit which is configured to display the update reception screen on the display unit if the display determining unit determines to display the update reception screen, and is configured not to display the update reception screen on the display unit if the display determining unit determines not to display the update reception screen;

an instruction receiving unit which is configured to receive the update instruction through the update reception screen displayed on the display unit; and an updating unit which is configured to update the color conversion profile in response to receiving an update instruction from the update reception screen;

wherein the image quality setting value includes at least one of the image setting values including:
(a) a resolution of the image data;
(b) a file format of the image data;
(c) a compression ratio of the image data; and
(d) an image setting value indicating color or monochrome, and wherein the update reference usage amount determining unit determines the update usage amount to a different value according to the image setting value included in the image quality setting value such that an update frequency of the color conversion profile is determined based on at least at least one of (a) the image setting value of the resolution of the image data, (b) the image setting value of the file format of the image data, (c) the image setting value of the compression ratio of the image data and (d) the image setting value indicating whether color or monochrome.

2. The display control apparatus according to claim 1, wherein the setting value includes a resolution of the image data which is any one of a plurality of resolutions including a first resolution and a second resolution lower than the first resolution, and wherein the display determining unit is configured to determine not to display the update reception screen if the resolution of the setting value is the second resolution.

3. The display control apparatus according to claim 1, wherein the setting value includes a file format of the image data which is any one of a plurality of file formats including a first file format and a second file format, and wherein the display determining unit is configured to determine not to display the update reception screen if the file format of the setting value is the second file format.

4. The display control apparatus according to claim 1, wherein the setting value includes a compression ratio of the image data which is any one of a plurality of compression ratios including a first compression ratio and a second compression ratio higher than the first compression ratio, and wherein the display determining unit is configured to determine not to display the update reception screen if the compression ratio of the setting value is the second compression ratio.

5. The display control apparatus according to claim 1, wherein the setting value includes the image setting value indicating color of monochrome, and wherein the display determining unit is configured to determine not to display the update reception screen if the image setting value indicates monochrome.

6. The display control apparatus according to claim 1, wherein the update reference usage amount after update of the color conversion profile is determined to a value higher than the update reference usage amount before the update of the color conversion profile.

7. The display control apparatus according to claim 1, wherein the setting value includes a resolution of the image data which is any one of a plurality of resolutions including a first resolution and a second resolution lower than the first resolution, and wherein the update reference usage amount in a case where the second resolution is set is determined to a value higher than the update reference usage amount in a case where the first resolution is set.

8. The display control apparatus according to claim 1, wherein the image data generating apparatus is a scanner having an automatic conveyance unit which is configured to automatically convey a plurality of document sheets, wherein the setting value includes whether the image data generating apparatus uses the automatic conveyance unit to generate the image data, and wherein the update reference usage amount in a case where the image data generating apparatus generates the image data using the automatic conveyance unit is higher than the update reference usage amount in a case where the image data generating apparatus generates the image data without using the automatic conveyance unit.

9. The display control apparatus according to claim 1, wherein the image quality setting value indicates that the image quality includes at least one of a resolution of the image data, a file format of the image data, a compression ration of the image data, an image setting value indicating color or monochrome, and a document placing method when reading a document to generate the image data.

10. A non-transitory computer-readable medium having a computer program for displaying on a display unit a user interface screen for an image data generating apparatus configured to generate image data using an image sensor, the computer program, when executed by a computer, causing the computer to perform operations comprising:

acquiring an image quality setting value, based on which the image data generating apparatus generates the image data using image sensor such that the image data has the image quality indicated by the image quality setting value;

determining an update reference usage amount based on the setting value;

acquiring a usage amount value representing a current usage amount of the image data generating apparatus;

determining whether to display an update reception screen if the acquired usage amount exceeds the update reference usage amount and determine not to display the update reception screen if the acquired usage amount does not exceed the update reference usage amount and the acquired usage amount value, wherein the update reception screen is for receiving an update instruction of a color conversion profile, including R values, G values and B values, based on which the image data in a color system depending on the image data generating apparatus is converted into image data in another color system;

causing the display unit to display the update reception screen thereon if it is determined to display the update reception screen, and not to display the update reception display thereon if it is determined not to display the update reception screen;

receiving an update instruction from the update reception screen displayed on the display unit; and updating the color conversion profile in response to receiving the update instruction from the update reception screen;

wherein the image quality setting value includes at least one of the image setting values including:

(a) a resolution of the image data;

(b) a file format of the image data;

(c) a compression ratio of the image data; and (d) an image setting value indicating color or monochrome, and wherein the determining of the update reference usage amount determines the update reference usage amount to a different value according to the image setting value included in the image quality setting value such that update frequency of the color conversion profile is determined based on at least at least one of (a) the image setting value of the resolution of the image data, (b) the image setting value of the file format of the image data, (c) the image setting value of the compression ratio of the image data and (d) the image setting value indicating whether color or monochrome.

11. The non-transitory computer-readable medium of claim 10, wherein the image quality setting value indicates that the image quality includes at least one of a resolution of the image data, a file format of the image data, a compression ration of the image data, an image setting value indicating color or monochrome, and a document placing method when reading a document to generate the image data.

12. A display control apparatus which is configured to display on a display unit a user interface screen for an image data generating apparatus configured to generate image data using an image sensor, the display control apparatus comprising:

a processor; and a memory having a computer readable instructions stored thereon that, when executed by the processor, causes the processor to perform steps of:

acquiring an image quality setting value, based on which the image data generating apparatus generates the image data using the image sensor such that the image data has the image quality indicated by the image quality setting value;

determining an update reference usage amount based on the image quality setting value;

acquiring a usage amount value representing a current usage amount of the image data generating apparatus;

determining whether to display an update reception screen if the acquired usage amount exceeds the update reference usage amount and determine not to display the update reception screen if the acquired usage amount does not exceed the update reference usage amount, wherein the update reception screen is for receiving an update instruction of a color conversion profile, including R values, G values and B values, based on which the image data a color system depending on the image data generating apparatus is converted into image data of another color system;

causing the display unit to display the update reception screen thereon if the determining step determines to display the update reception screen, and not to display the update reception screen thereon if the determining step determines not to display the update reception screen;

receiving the update instruction through the update reception screen displayed on the display unit; and updating the color conversion profile in response to receiving an update instruction from the update reception screen;

wherein the image quality setting value includes at least one of the image setting values including:

(a) a resolution of the image data;

(b) a file format of the image data;

(c) a compression ratio of the image data; and (d) an image setting value indicating color or monochrome, and wherein the determining of the update reference usage amount determines the update reference usage amount to a different value according to the image setting value included in the image quality setting value such that update frequency of the color conversion profile is determined based on at least at least one of (a) the image setting value of the resolution of the image data, (b) the image setting value of the file format of the image data, (c) the image setting value of the compression ratio of the image data and (d) the image setting value indicating whether color or monochrome.

13. The display control apparatus according to claim 12, wherein the image quality setting value includes a resolution of the image data which is any one of a plurality of resolutions including a first resolution and a second resolution lower than the first resolution, and wherein the determining step determines not to display the update reception screen if the resolution of the setting value is the second resolution.

14. The display control apparatus according to claim 12, wherein the image quality setting value includes a file format of the image data which is any one of a plurality of file formats including a first file format and a second file format, and wherein the determining step determines not to display the update reception screen if the file format of the setting value is the second file format.

15. The display control apparatus according to claim 12, wherein the image quality setting value includes a compression ratio of the image data which is any one of a plurality of compression ratios including a first compression ratio and a second compression ratio higher than the first compression ratio, and wherein the determining step determines not to display the update reception screen if the compression ratio of the image quality setting value is the second compression ratio.

16. The display control apparatus according to claim 12, wherein the image quality setting value includes the image setting value indicating color or monochrome, and wherein the determining step determines not to display the update reception screen if the image setting value indicates monochrome.

17. The display control apparatus according to claim 12, wherein the update reference usage amount after update of the color conversion profile is determined to a value higher than the update reference usage amount before the update of the color conversion profile.

18. The display control apparatus according to claim 12,
wherein the setting value includes a resolution of the image data which is any one of a plurality of resolutions including a first resolution and a second resolution lower than the first resolution, and
wherein the update reference usage amount in a case where the second resolution is set is determined to a value higher than the update reference usage amount in a case where the first resolution is set.

19. The display control apparatus according to claim 12,
wherein the image data generating apparatus is a scanner having an automatic conveyance unit which is configured to automatically convey a plurality of document sheets,
wherein the setting value includes whether the image data generating apparatus uses the automatic conveyance unit to generate the image data, and
wherein the update reference usage amount in a case where the image data generating apparatus generates the image data using the automatic conveyance unit is higher than the update reference usage amount in a case where the image data generating apparatus generates the image data without using the automatic conveyance unit.

20. The display control apparatus according to claim 12, wherein the image quality setting value indicates that the image quality includes at least one of a resolution of the image data, a file format of the image data, a compression ration of the image data, an image setting value indicating color or monochrome, and a document placing method when reading a document to generate the image data.

* * * * *

UNITED STATES PATENT AND TRADEMARK OFFICE
CERTIFICATE OF CORRECTION

PATENT NO. : 9,787,857 B2  
APPLICATION NO. : 13/626737  
DATED : October 10, 2017  
INVENTOR(S) : Mayumi Kuraya Page 1 of 1

It is certified that error appears in the above-identified patent and that said Letters Patent is hereby corrected as shown below:

In the Claims

Claim 5:
Column 17, Line 67: Delete "color of" and insert -- color or -- therefor.

Signed and Sealed this
Tenth Day of July, 2018

Andrei Iancu
*Director of the United States Patent and Trademark Office*